United States Patent
Kunzi et al.

(10) Patent No.: US 6,995,323 B2
(45) Date of Patent: Feb. 7, 2006

(54) DEVICE FOR MONITORING THE OPERATING CONDITIONS OF A BALANCE

(75) Inventors: Hansruedi Kunzi, Greifensee (CH); Roger Leisinger, Zürich (CH); Marc Blochlinger, Hombrechtikon (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/997,370

(22) Filed: Nov. 24, 2004

(65) Prior Publication Data

US 2005/0072605 A1    Apr. 7, 2005

Related U.S. Application Data

(63) Continuation of application No. PCT/EP03/50196, filed on May 26, 2003.

(30) Foreign Application Priority Data

May 29, 2002  (DE) ................................ 102 24 123

(51) Int. Cl.
*G01G 23/01*    (2006.01)
(52) U.S. Cl. ................. 177/25.13; 177/25.19; 702/101
(58) Field of Classification Search .. 177/25.11–25.17, 177/25.19, 180, 238; 702/173–175, 101–102; 73/1.13
See application file for complete search history.

(56) References Cited

U.S. PATENT DOCUMENTS

| | | | |
|---|---|---|---|
| 4,494,620 A | 1/1985 | Knothe et al. | ................. 177/25 |
| 4,858,161 A | 8/1989 | Baumann | ............... 364/571.03 |
| 5,528,499 A * | 6/1996 | Hagenbuch | .................. 701/50 |
| 6,576,849 B2 * | 6/2003 | Bliss et al. | .............. 177/25.13 |

FOREIGN PATENT DOCUMENTS

| | | |
|---|---|---|
| DE | 9415153 | 12/1994 |
| DE | 19709624 | 2/1998 |
| EP | 0689041 | 12/1995 |
| EP | 19713799 | 10/1998 |
| FR | 2639111 | 5/1990 |

OTHER PUBLICATIONS

"Turbo Pascal: Self-Teaching Guide", Keith Weiskamp, John Wiley & Sons, Inc. New York, pp. 164-168, Copyright 1991.*

"Systems Architecture : Hardware and Software in Business Information Systems", Stephen D. Burd, University of New Mexico, Course Technology—ITP, Cambridge MA, pp. 97-105. Copyright 1996.*

* cited by examiner

*Primary Examiner*—Randy W. Gibson
(74) *Attorney, Agent, or Firm*—Standley Law Group LLP (57) ABSTRACT

A device for monitoring an operating condition is incorporated in a balance with a weighing cell, an electronic weighing circuit arrangement (15), an output unit (21, 22, 44), and at least one electronic inclination sensor (13). The circuit arrangement (15) includes a signal-processing device (17), a memory device (19) as well as a time clock (20). Based on a sensor signal received from the electronic inclination sensor (13), the signal-processing device (17) determines a quantity that is indicative of the operating condition of the balance. The signal-processing device (17) also determines the current time and assigns a time value to the quantity that represents the operating condition. The resultant vector-like sets of time and operating condition data are transmitted to and stored in the memory device (19), so that the data are at all times available for transmission to an output unit (21, 22, 44).

18 Claims, 5 Drawing Sheets

DEVICE FOR MONITORING THE OPERATING CONDITIONS OF A BALANCE

CROSS-REFERENCE TO RELATED APPLICATIONS

This application is a continuation of International Patent Application Ser. No. PCT/EP 03/50196 filed May 26, 2003 which, in turn, claims the priority of German Patent Application DE 10224123,6, filed May 29, 2002, both of which are hereby incorporated by reference in their entirety.

BACKGROUND OF THE INVENTION

The invention relates to a device for monitoring the operating condition of a gravimetric measuring instrument, specifically a balance. The balance for which the inventive monitoring device is proposed has a weighing cell and an electronic weighing circuit arrangement with a signal-processing device, a memory device and a time clock, an output unit, as well as at least one electronic inclination sensor that is connected for communication with the signal-processing device.

Balances and other gravimetric measuring instruments, for example instruments for the gravimetric determination of moisture content or thermo-gravimetric instruments, constitute a class of instruments that have to meet very particular requirements in regard to their setup in the place where they are used. A balance that is set up for example in a laboratory must be positioned in such a way that the load receiver of the weighing cell of the balance is aligned exactly in the direction of the force of gravity. If the alignment deviates from the direction of the gravitational field, the result of weighings performed on the balance will be short by a factor that represents the cosine of the angle of inclination, i.e., the angle by which the alignment of the load receiver of the weighing cell deviates from the direction of the gravity force. In a precisely assembled balance, the same angle also represents the deviation of the seating surface of the weighing cell from the horizontal direction. The position where the load receiver is perfectly aligned with the direction of gravity may also be referred to as the reference position of the balance. For balances that are subject to official certification, it is therefore often necessary to provide a leveling device and an inclination sensor, for example a spirit level which consists of a container that is preferably made of glass and partially filled with a liquid, so as to leave a gas bubble. The leveling device is preferably incorporated in the supporting feet of the balance through an arrangement where the respective heights of at least two of the supporting feet can be varied by means of height-adjustment screws.

The known state of the art includes different inclination-measuring devices that register the inclination angle of a balance at its place of installation electronically. For example, DE 32 34 372 A1 describes different versions of electronic inclination-measuring devices such as a spirit level with an optical sensor, a capacitive inclination-measuring device, or a pendulum that is equipped with a strain gauge to determine its deviation from the vertical position. The measuring signal of an electronic inclination-measuring device of this type is used to compensate inclination-related weighing errors and thus to ensure a correct weighing result even if the balance is not in exact alignment with the direction of gravity, particularly in the case where the inclination of the balance is dependent on the weighing load placed on the balance.

A balance with an electronic inclination-measuring device is disclosed in JP 61 108927 A2 where the inclination-measuring device consists of a container that is partially filled with an electrically conductive fluid, leaving an air bubble. An inclined position of the balance is detected through the change in electrical resistance, and an acoustical alarm is triggered if the balance is found to be too far out of level.

The inclination-monitoring device for a balance described in FR 2 639 111 A1 is capable of selectively detecting out-of-level positions relative to horizontal x- and y-directions. This inclination-monitoring device has at least one inclination sensor, an electrical circuit with an electrical power supply for the inclination-monitoring device, as well as a relay switch which causes the system to block the weighing function when given limits of the inclination are exceeded. As an alternative possibility, the display of the weighing result or its transfer to peripheral instruments can be blocked. Furthermore, it is possible to indicate the out-of-level condition of the balance as well as the direction of the slope gradient by way of light-emitting diodes.

Especially in weighing processes that are relevant to product quality, it is required procedure to check the spirit level before starting the actual weighing process in order to verify that the balance is properly leveled. However, this rule is not always followed in practice. If a user of the balance notices at any time that the balance is no longer in its reference position, he is confronted with the question whether the deviation is relevant, i.e., by how much the actual position deviates from the reference condition and for how long the deviation has been present. Subsequently, the magnitude of the potential consequences has to be assessed.

Even if an alarm is triggered in a balance when the out-of-level condition exceeds given limits, it is not necessarily evident to the user of the balance how far back in time the balance was put out of its reference position and what caused the out-of-level condition. However, the so-called GLP (Good Laboratory Practice) guidelines mandate traceable proof of the reliability of the weighing result. It is therefore necessary to know the point in time at which the weighing result ceased to be reliable. An automatic correction of the weighing result in regard to an electronically detected out-of-level condition of the balance is not always desirable, because the deviation from the leveled position could in some cases deteriorate far beyond a justifiable tolerance limit.

OBJECT OF THE INVENTION

It is therefore the object of the present invention to provide the user of a gravimetric measuring instrument, specifically of a balance, with a monitoring concept that provides uninterrupted information about the operating condition of the measuring instrument or balance in regard to its leveled position.

SUMMARY OF THE INVENTION

In a device for monitoring the operating condition of a gravimetric measuring instrument, specifically in a balance which includes a weighing cell and an electronic weighing circuit arrangement with a signal-processing device, a memory device and a time clock, and which further includes an output unit as well as at least one electronic inclination sensor that is connected for communication with the signal-processing device, the signal-processing device has means whereby a quantity that is indicative of the operating condition of the balance can be determined from a signal of the at least one electronic inclination sensor. Furthermore, the signal-processing device has means to correlate a time-related quantity to the quantity that indicates the operating condition, as well as means for transmitting and storing the resultant vector-like sets of data values in the memory device, where the data are always kept available for transmission to an output unit.

The state of inclination of a balance should be considered a relevant operating parameter in the measurement process and should be kept available at all times in response to an electronic request. This requirement is met by the inventive concept of a balance with an electronic inclination sensor which registers the operating state specifically in regard to an inclined position of the balance. The user receives a direct feedback about the operating condition of the balance as well as a result which can be documented and which remains permanently available and can be retrieved also at any later point in time.

With the foregoing arrangement, a quantity that describes the operating condition as a function of time can be delivered by the output unit either as a continuously running data collection or only as a current value for each refresh cycle of the output unit. However, with preference, the quantity that characterizes the operating condition is stored as a function of time in a history file in the memory device, from where the data are retrievable at any subsequent time so that for example a hard copy can be produced with a printer.

The advantage of a recorded history and data output about the operating condition, in particular an inclination-angle value, lies in the fact that the reliability of the weighing result can be traced back in time.

In a preferred embodiment of the invention, the signal of the at least one electronic inclination sensor is interrogated and a quantity that is indicative of the operating condition of the balance is stored at regular time intervals, specifically at regular time intervals whose length can be modified. If The balance is equipped with a calibration device, an interrogation of the inclination signal as well as the entry of a quantity that characterizes the operating condition of the balance takes place after every automatic calibration process. It is also desirable to determine and store an updated value of this quantity each time the balance is switched on.

In an advantageous further developed embodiment of the inventive concept, the signal-processing device includes means for assigning limits, in particular warning limits and/or intervention limits, to a quantity that indicates the operating condition of the balance. The limits are transmitted together with the indicative quantity to the output unit which delivers an output of the data. The limit values can be modified by way of an input unit. When a limit is reached, for example the warning limit, an acoustical and/or optical warning signal is given by the output unit. When the intervention limit is reached, the indication of the weighing result changes its appearance, i.e., the display of the balance is switched to a non-active representation or, in the case of a color display, the indication of the result changes color. As an alternative possibility, any further weighing can be blocked. A limit value can also be defined in such a manner that an automatic calibration takes place when the limit is reached.

Another further developed embodiment of the invention may be equipped with a level-adjusting device which could for example be driven by a motor, in order to automatically correct an out-of-level condition when a limit value is reached, so that the gravimetric measuring instrument is returned to its reference position.

In a particularly preferred embodiment of the inventive device, the output unit has a visual display of a leveling aid which guides the user in setting the gravimetric measuring instrument to its reference position. The leveling aid may, for example, indicate which leveling unit is to be adjusted and show the sense of rotation for the adjustment.

BRIEF DESCRIPTION OF THE DRAWINGS

The invention is further described hereinafter with reference to the attached drawings representing schematic views of an example of a balance that is equipped with an inclination sensor as well as representing a method prescribed by the invention for using the proposed device. In the drawings.

DETAILED DESCRIPTION OF PREFERRED EMBODIMENTS

Figure 1:
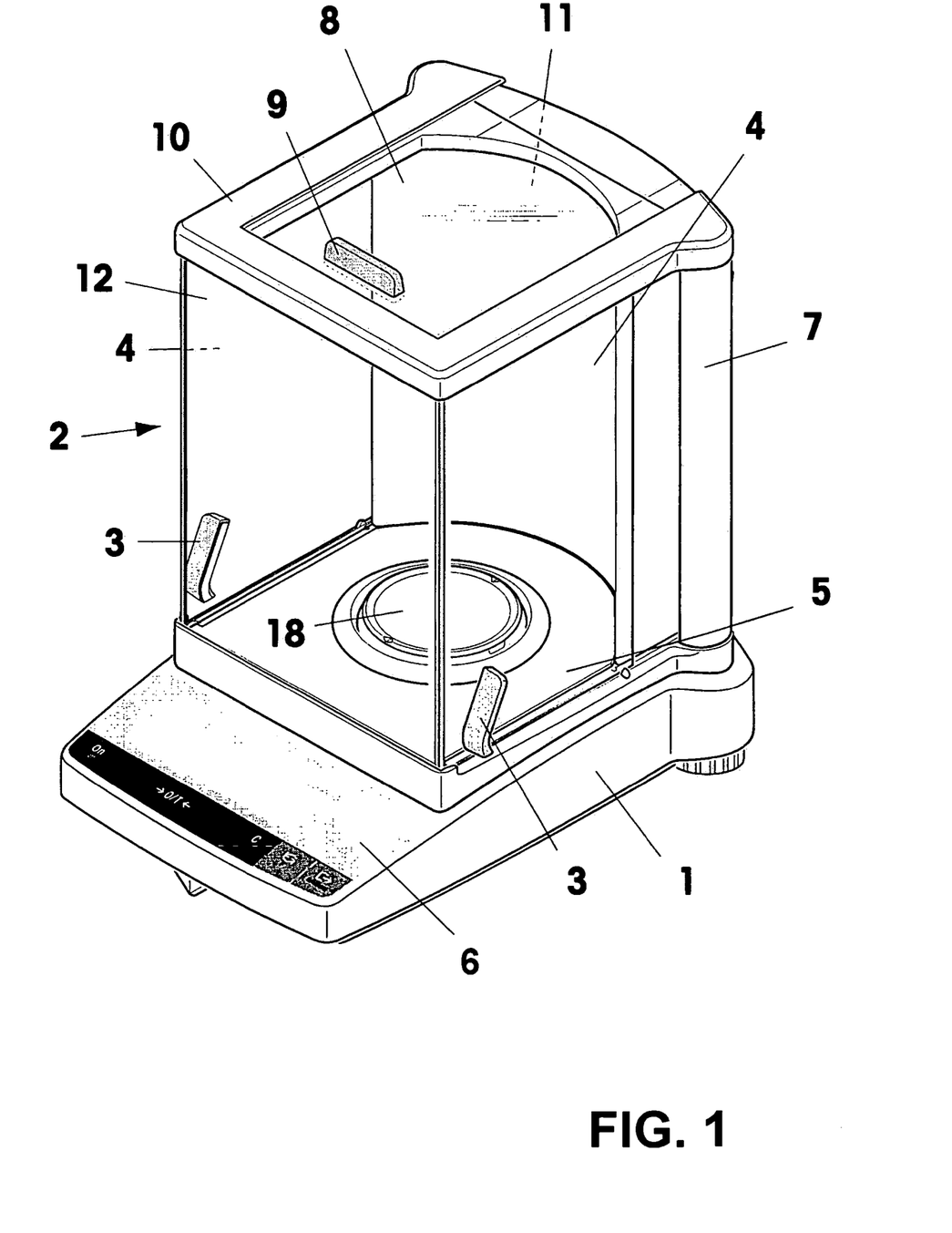
FIG. 1 represents a balance in a three-dimensional view.

FIG. 1 illustrates a balance with a balance housing 1 that includes an integrally connected display- and operating unit 6. The balance housing 1 contains the weighing cell (not visible in the drawing) and the related electronic circuit arrangement. A weighing pan 18 is connected to the weighing cell through a passage opening in the floor 5 of the weighing compartment 2. The weighing compartment 2 is enclosed by a draft shield consisting of a front wall 12, two side panels 4 which can be pushed by handles 3 to open and close the weighing compartment 2, and by a ceiling 10. The ceiling 10 includes a ceiling panel 8 that is likewise movable by means of a handle 9. The weighing compartment 2 is further delimited by a rear wall 11 that is part of a rearward housing compartment 7.

Figure 2:
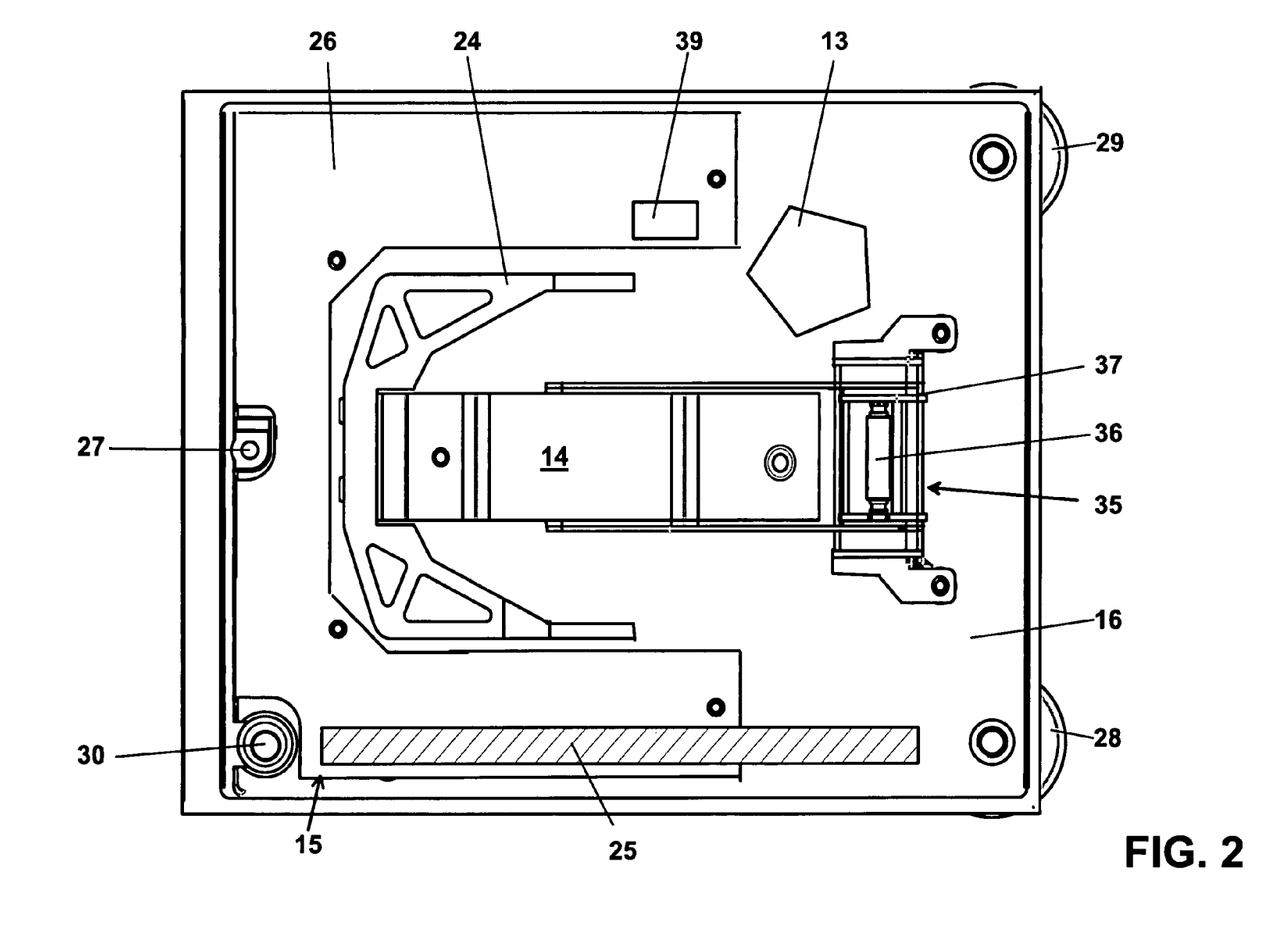
FIG. 2 represents a view into the floor compartment of a balance with an inclination sensor installed.

FIG. 2 illustrates a schematically simplified top view of the floor compartment of the balance housing. Components that are not essential to the invention have been omitted from the drawing. The weighing cell 14 is mounted on a U-shaped holder arrangement 24 that is solidly connected to the housing floor. The electronic weighing circuit arrangement 15 is accommodated on a circuit board 25 standing on edge and a circuit board 26 lying flat in the floor compartment. An electronic inclination sensor 13 is fastened to the housing floor 16 preferably in the vicinity of the weighing cell 14, because the weighing cell 14 is the element that shows a sensitive reaction to an out-of-level position of the balance. It is understood that, as far as possible, the housing floor 16 has a plane, level surface. The inclination sensor 13 can also be mounted on the circuit board 26 of the electronic circuit arrangement 15 as long as there is assurance that the circuit board 26 is in a defined alignment in relation to the weighing cell 14. Preferably, the inclination sensor 13 is a bi-axial sensor, so that the direction of the inclination gradient can also be determined. The balance is standing on three feet 27, 28, 29. For the foot 27, only the fastening mount in the housing floor can be seen in the drawing. The two feet 28, 29 shown in the right-hand part of FIG. 2 are equipped with a leveling device, i.e., with adjustment screws to adjust the balance to its reference position. The reference symbol 30 indicates a spirit level that serves to visually verify that the balance is in a leveled position. FIG. 2 further shows a calibration device 35 with a calibration weight 36 arranged so that it can be put on a supporting seat 37 that is attached to a lever extension 38 of the weighing cell.

Figure 3:
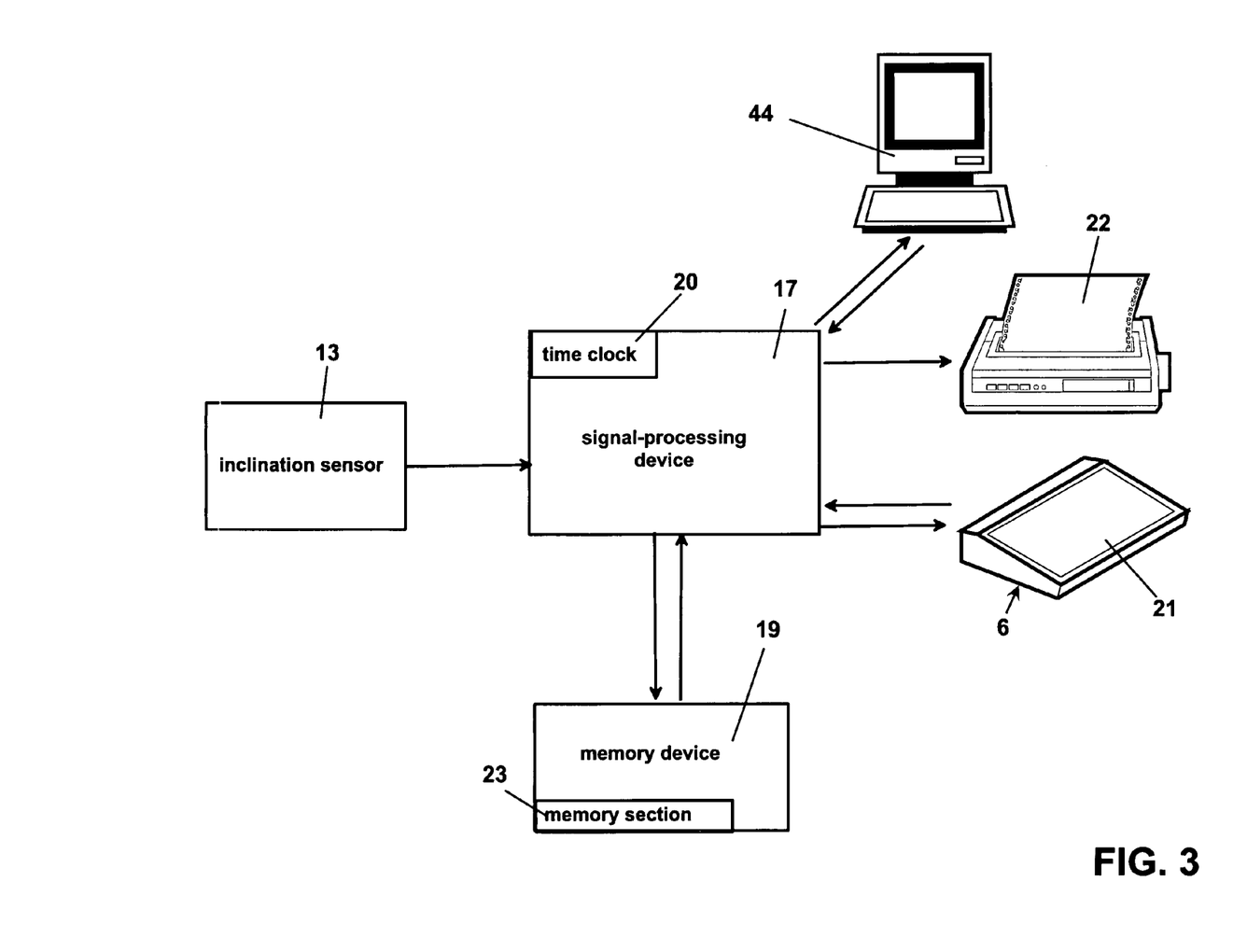
FIG. 3 represents a block diagram showing how individual components of the balance work together in recording the operating history of the balance.

The block diagram of FIG. 3 serves to illustrate the way in which the individual components of the balance work together to record the history of the operating condition, in particular with regard to the inclination of the balance, and to provide a representation of the current state of inclination. The electronic inclination sensor 13 continuously generates an inclination-dependent signal. The signal is transmitted to the signal-processing device 17, for example in response to an event-triggered interrogation. If the sensor 13 is a biaxial sensor, or if two individual sensors are used as an alternative possibility, the signal is delivered as a vector of two numeric values to the signal-processing device 17. A clock circuit 20 which is preferably integrated in the signal-processing device 17 provides a time value that is assigned to the inclination signal, and the vector quantity consisting of the time value and two inclination values is transferred to the memory device 19 where it is stored in a memory section 23 reserved for storing the vector quantities. The value sets or vectors which follow each other in a time sequence are stored in a so-called history file. The history file can be recalled by the signal-processing device 17 at any time and delivered for example as a printout from a printer 22 that is connected to the balance. The current inclination signal and/or an inclination signal as a function of time can also be represented graphically on a display 21 of the display- and operating unit 6. Alternatively, the values that make up the history file can also be transmitted to an external processor- and memory system, for example a laboratory information management system (LIMS) 44.

Figure 4:
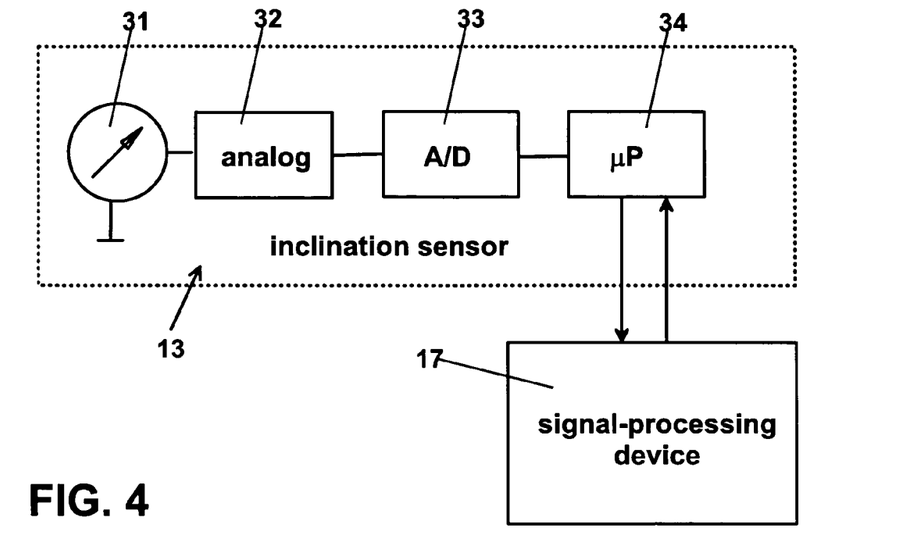
FIG. 4 represents a block diagram of the inclination sensor and the communication between the inclination sensor and the signal-processing device of the balance.

As represented schematically in FIG. 4, the inclination sensor 13 includes a sensor element 31 and electronic components consisting of an analog filter- and amplifier unit 32, an analog/digital converter 33, as well as a microprocessor 34, which serve to process the sensor signal. The microprocessor 34 is connected for communication with the signal-processing unit 17 of the electronic weighing circuit arrangement 15. Thus, the inclination sensor 13 is configured as an independent unit which continuously determines the current inclination signal which is then kept available in the microprocessor 34. Thus, the current inclination signal can be called up at any time from the processor of the signal-processing device 17 of the balance.

Figure 5:
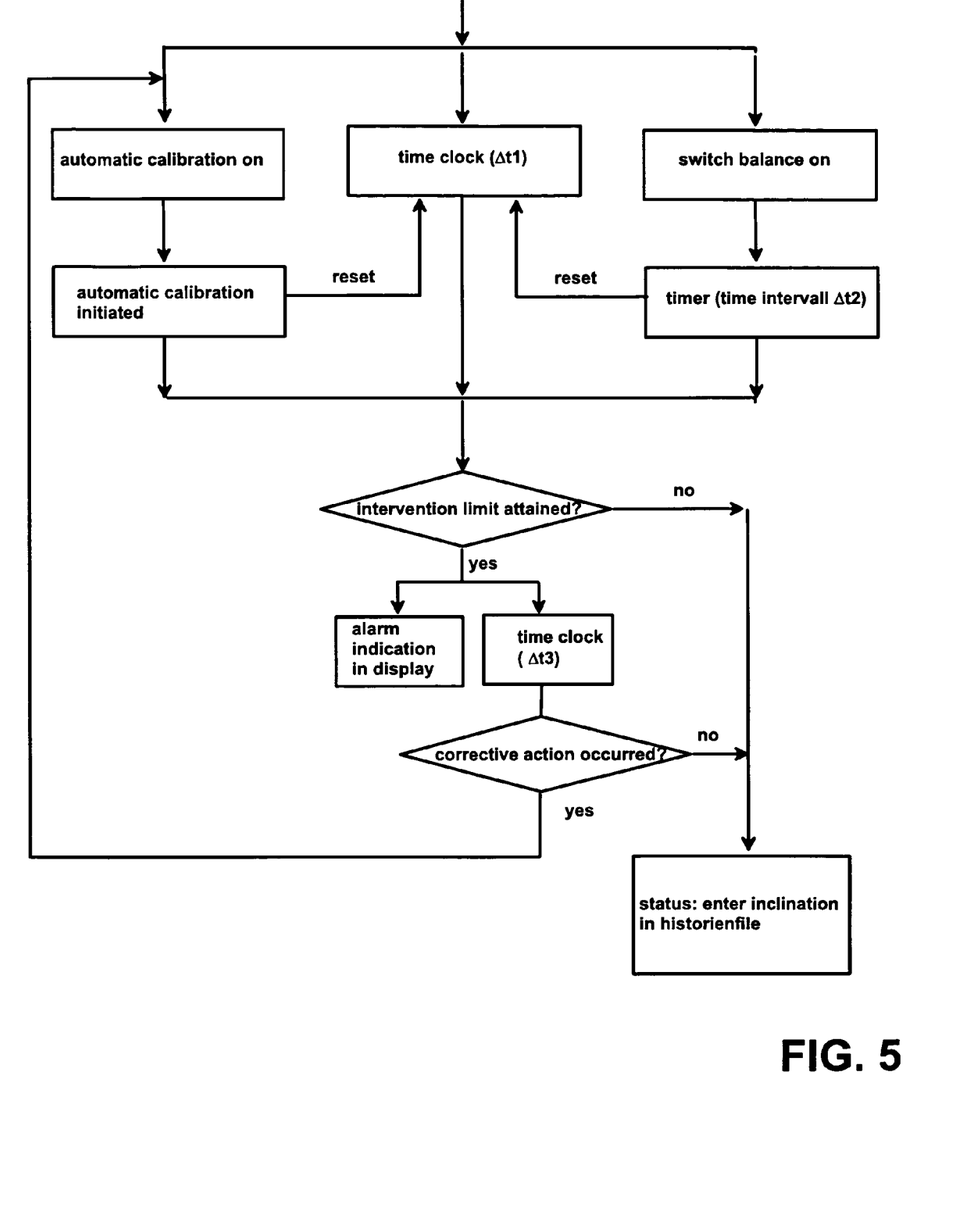
FIG. 5 represents a flowchart diagram for different modes of recording a time-dependent inclination value in the history file of the memory device.

An example that illustrates how different modes of interrogation work together is shown in the flowchart diagram of FIG. 5. In a first mode, the interrogation of the inclination signal takes place at regular time intervals $\Delta t1$. The length of the intervals can be set by the user, for example by making an entry in the display- and operating unit 6 (see FIGS. 1 and 3). At the end of each time interval $\Delta t1$ whose preset length is measured by the clock circuit 20, the signal-processing device performs an interrogation of the inclination signal that is present in the microprocessor 34, and the signal is stored together with the time of the interrogation in the memory section 23 of the memory device 19.

It can also occur that the signal-processing device 17 responds to events that cause an interrogation to be initiated before the end of a time interval $\Delta t1$. Such an event can be constituted for example by an automatically occurring calibration by means of a calibration device 35 that is built into the balance (see FIG. 2). The automatic calibration takes place for example if a temperature sensor 39 that is likewise built into the balance measures a temperature change that is registered by the signal-processing device 17 as being in excess of a given value. In this case, the inclination signal together with the current time value is likewise stored in the memory section 23 of the memory device 19. Subsequently, the clock circuit 20 which measures the time interval $\Delta t1$ to the next interrogation of the inclination signal is reset to zero.

An interrogation of the state of inclination of the balance can also be programmed to occur after the balance has been switched on. Preferably, this interrogation takes place after allowing for a warm-up time $\Delta t2$ of a few minutes which is allotted, e.g., by the clock circuit 20. In this case, too, the clock circuit 20 which measures the time interval $\Delta t1$ to the next interrogation of the inclination signal is reset to zero.

In a further variant (not shown in the drawing figures) of the operating program of the inclination sensor, the microprocessor 34 is equipped with a comparator unit which compares, e.g., consecutive values of the inclination-dependent signal to each other and automatically transmits the current inclination value to the signal-processing unit 17 if a difference between consecutive values is found to exceed a given magnitude. The signal-processing unit 17 again assigns to the current inclination value a clock time that is supplied by a continuously running clock circuit, whereupon the set of values is stored in the memory section 23 of the memory device 19.

In each of the program variants described above, a time value is assigned to the inclination-dependent signal and the value pair or value vector including the time value is recorded in the history file in the memory device of the electronic weighing circuit arrangement. The history file is at all times available for output on command by way of an output device which can be a printer or a display unit, either by pressing a specific function key or by entering a command on the display- and operating unit. It is also conceivable to continuously confirm the correct operation of the balance by continuously showing a simple indication in the display of the balance, for example by displaying the letters "OK". The data that the inclination sensor 13 sends to the signal-processing unit 17 do not necessarily have to be value pairs, they could also be individual single data values that indicate only whether or not the state of inclination of the balance is within or outside of given limits, i.e., whether or not the balance is fit for continued operation.

The output representation of the time-dependent state of inclination can also be combined with an indication of limit values, which can be so-called warning limits and/or intervention limits. If a warning limit is reached, the user of the balance is alerted that the balance has a tendency to leave its reference position. If the intervention limit is reached, the user is alerted to restore the reference position of the balance by means of the leveling device. The condition of the balance in relation to the limit values can be indicated in the display for example by three light-emitting diodes, with a green-colored diode being lit when the inclination of the balance is within tolerance, a yellow-colored diode when the warning limit has been exceeded, and a red-colored diode when the intervention limit has been exceeded. The latter case could also be announced by way of an acoustical warning signal, and/or the balance display could show blinking weight values or switch itself off.

The last-described situation requires that the current operating condition of the balance be recorded in the history file, as shown in FIG. 5. This can occur after a short time delay interval Δt3 which gives the user the opportunity to make a leveling adjustment, i.e., to restore the reference position of the balance. In the absence of such an intervention by the user, the current inclination of the balance is recorded in the history file. If the user does take action, the program proceeds to the step of initiating a calibration of the balance which is followed by an interrogation whether the intervention limit is met or exceeded and, if the limit is not met or exceeded, by a recordation of the current inclination of the balance in the history file. In the affirmative case, i.e., if the intervention limit is still met or even exceeded, an alarm is triggered again and the program proceeds in the manner described above in this paragraph. The program can loop several times through this same cycle.

The leveling condition of the balance can also be indicated as a graph in the display, wherein a quantitative value for the inclination is represented by a horizontally or vertically arranged bar. The points where limit values are attained or exceeded can be indicated by blinking or, if a color display is used, by changing the color between green, yellow and red.

Representing the magnitude of the inclination graphically according to the foregoing concept requires only a single numerical value. As a preferred solution, the magnitude of the inclination is calculated as the square root of the sum of the squares of the respective component values for the directions of the inclination measurement.

Figures 6, 7:
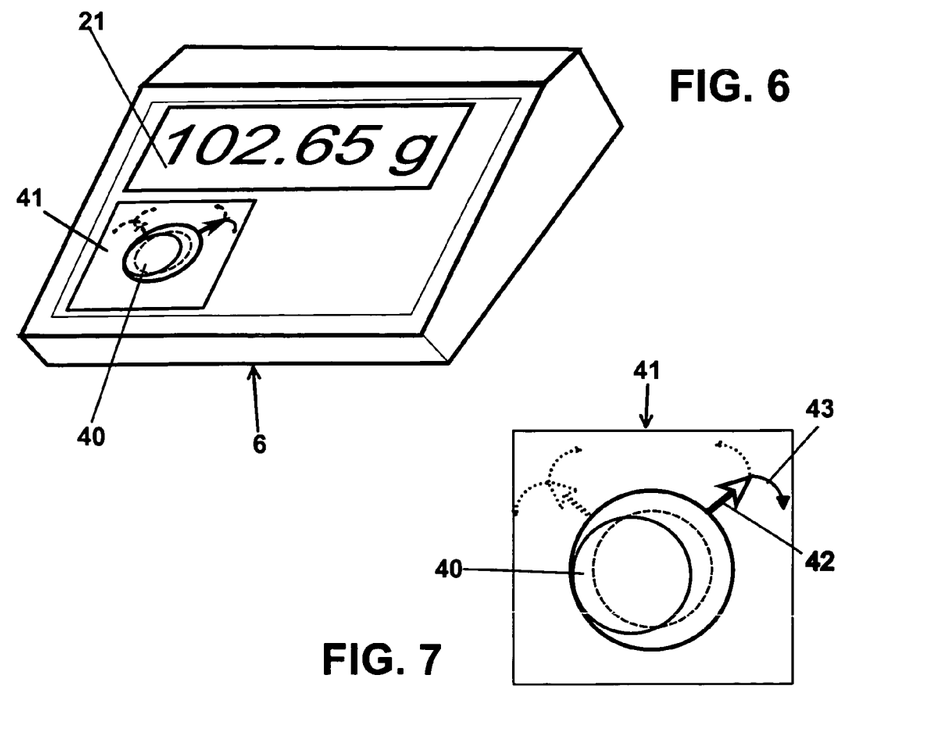
FIG. 6 represents a display with a visual aid for a manual level adjustment of the balance.
FIG. 7 represents an enlarged view of the visual adjustment aid of FIG. 6.

A graphical representation of the inclination values of the balance can be used in particular for the purpose of leveling a balance that has lost its reference position. The leveling procedure is performed preferably by hand, for example by adjusting the respective heights of the two feet 28, 29 of the balance through rotary adjustments of a screw mechanism. As shown in FIG. 6, a spirit level bubble 40 can be indicated electronically by means of a pixel array in the display- and operating unit 6, which makes it immediately evident to the user how far the balance has been put out of its reference position. In particular, this concept offers the additional possibility of a blinking mode of the sprit level image 40 to announce when the inclination has reached a tolerance limit, for example the warning limit.

The electronically represented spirit level image 40 can be combined with a leveling guide 41 which assists the user of the balance in the leveling process for example by indicating which of the feet 28, 29 needs adjustment and which way it needs to be turned in order to return the balance to its reference position. In FIG. 7, which represents a detail view of the leveling guide 41 of FIG. 6, an arrow 42 points to the adjustable foot that needs to be turned, while the arcuate arrow 43 indicates the sense of rotation for the adjustment. The arrows 42, 43 that indicate the currently required adjustment operation are lit up while the remaining arrows (indicated by dotted lines) remain invisible in the display. With a leveling guide 41 of this type, the level adjustment can be performed easily and quickly even by relatively inexperienced users of a balance.

Of course, a leveling guide, too, can be realized in many different ways. A motorized level-adjustment which could be triggered, e.g., by way of an operating key in the display- and operating unit 6, is likewise within the scope of the inventive concept.

It is not necessary for a history file to be limited exclusively to inclination-related values of the balance. The file can also be used to keep records of additional parameter values of the balance such as the temperature or specific event data, e.g., a record of a calibration that has been performed.

Drawing Legends

| FIG. 3 | |
| --- | --- |
| Neigungssensor | Inclination sensor |
| Zeitgeber | Time clock |
| Signalverarbeitungseinrichtung | Signal-processing device |
| Speichereinrichtung | Memory device |
| Speicherplatz | Memory section |
| FIG. 4 | |
| Neigungssensor | Inclination sensor |
| Signalverarbeitungseinrichtung | Signal-processing device |
| FIG. 5 | |
| automatische Kalibrierung ein | automatic calibration on |
| Zeitgeber | Time clock |
| Waage einschalten | switch balance on |
| automatische Kalibrierung ausgelöst | automatic calibration initiated |
| Zeitintervall | time interval |
| Eingreifgrenze erreicht? | Intervention limit attained? |
| Alarm in der Anzeige | alarm indication in display |
| Zeitgeber | Time clock |
| Benutzeraktion erfolgt | Corrective action occurred? |
| Status: Neigung in Historienfile schreiben | Status: enter inclination in history file |
| ja, nein | yes, no |

What is claimed is:

1. A device for monitoring an operating condition of a balance with a weighing cell, the device comprising:
    an electronic weighing circuit arrangement (15) with a signal-processing device (17);
    a memory device (19);
    a time clock (20);
    an output unit (21, 22, 44); and
    at least one electronic inclination sensor (13) positioned for detecting an operating condition of the weighing cell with regard to level and that is connected for communicating an inclination-dependent signal to the signal-processing device (17),
    wherein the signal-processing device (17) comprises means whereby a quantity that is indicative of the operating condition of the balance is determined from the inclination-dependent signal of the at least one electronic inclination sensor (13),
    wherein the signal-processing device (17) also comprises means whereby time values representing a current time are combined with condition values representing a current operating condition to form vector data sets, and
    wherein the signal-processing device (17) further comprises means whereby said vector data sets are transmitted to and stored in the memory device (19), so that said vector data sets are at all times available for transmission to the output unit (21, 22, 44).

2. The device according to claim 1, wherein the output unit (21, 22, 44) comprises means for a continuous delivery of said condition values.

3. The device according to claim 1, wherein the memory device (19) comprises a memory section (23) operable to hold a history file of said vector data sets, and wherein the vector data sets are retrievable at all times from said history file.

4. The device according to claim 3, wherein the balance has an output connection whereby said history file can be sent to at least one of a printer (22), a display (21), and an external processor- and memory system.

5. The device according to claim 1, wherein the signal-processing device (17) at regular time intervals interrogates the signal of the at least one electronic inclination sensor (13) and determines as well as stores one of said vector data sets.

6. The device according to claim 5, wherein said regular time intervals are modifiable.

7. The device according to claim 1, wherein the balance comprises a calibration device (35) operable to perform calibration measurements, and wherein after every calibration measurement the signal-processing device (17) interrogates the signal of the at least one electronic inclination sensor (13) and determines as well as stores one of said vector data sets.

8. The device according to claim 1, wherein each time the balance is switched on, the signal-processing device (17) interrogates the signal of the at least one electronic inclination sensor (13) and determines as well as stores one of said vector data sets.

9. The device according to claim 1, wherein one of the signal-processing device (17) and the inclination sensor (13) includes means for assigning at least one limit to the quantity that is indicative of the operating condition of the balance, said limit signifying at least one of a warning and a call for operator intervention, wherein said at least one limit is transmitted together with said indicative quantity to the output unit (21, 22, 44) where said at least one limit and indicative quantity are delivered as output.

10. The device according to claim 9, wherein the at least one limit can be modified by way of an input unit (6).

11. The device according to claim 9, wherein the at least one limit signifies a warning and wherein upon reaching said at least one limit, the output unit (21, 22, 44) gives at least one of an acoustical warning signal and an optical warning signal.

12. The device according to claim 9, wherein the at least one limit signifies a call for operator intervention and wherein upon reaching said at least one limit the indication of the weighing result is changed.

13. The device according to claim 9, wherein the at least one limit signifies a call for operator intervention and wherein upon reaching said at least one limit, any further weighing is blocked.

14. The device according to claim 9, wherein the balance comprises a calibration device (35) which performs an automatic calibration when the at least one limit is reached.

15. The device according to claim 9, wherein the balance has a reference position and wherein the balance comprises a motor-driven level-adjusting device which automatically corrects a deviation from said reference position when the at least one limit is reached, so that the balance is returned to said reference position.

16. The device according to claim 1, wherein the balance has a reference position and wherein the balance comprises a leveling guide (41) which can be visually displayed on the output unit (21) as a means of assisting a user in selling the balance to the reference position.

17. The device according to claim 16, wherein the balance comprises a plurality of adjustment units operable to adjust the balance to said reference position through rotary adjustments, and wherein the leveling guide (41) comprises means for indicating which of said adjustment units needs adjusting and means for showing a sense of rotation for the adjustment.

18. A balance comprising the device according to claim 1.

* * * * *